(12) United States Patent
Vasilev

(10) Patent No.: US 11,897,637 B2
(45) Date of Patent: Feb. 13, 2024

(54) SYSTEM AND METHOD OF GENERATING A MOMENTUM CHANGE IN A VEHICLE BY PHASE CHANGING MATTER IN A CLOSED SYSTEM

(71) Applicant: Ivaylo Trendafilov Vasilev, Rockwall, TX (US)

(72) Inventor: Ivaylo Trendafilov Vasilev, Rockwall, TX (US)

( * ) Notice: Subject to any disclaimer, the term of this patent is extended or adjusted under 35 U.S.C. 154(b) by 0 days.

(21) Appl. No.: 17/566,475

(22) Filed: Dec. 30, 2021

(65) Prior Publication Data
US 2022/0219840 A1 Jul. 14, 2022

Related U.S. Application Data

(60) Provisional application No. 63/135,177, filed on Jan. 8, 2021.

(51) Int. Cl.
*B64G 1/40* (2006.01)

(52) U.S. Cl.
CPC .................................... *B64G 1/409* (2013.01)

(58) Field of Classification Search
CPC .......... B64G 1/409; B64G 1/50; B64G 1/506; F03H 99/00; B64D 27/00
See application file for complete search history.

(56) References Cited

U.S. PATENT DOCUMENTS

| | | | |
|---|---|---|---|
| 4,745,906 A * | 5/1988 | DeBeni | F28D 15/06 126/584 |
| 5,259,447 A * | 11/1993 | Ogushi | F25B 23/006 417/209 |
| 6,519,955 B2 * | 2/2003 | Marsala | H01L 23/427 257/E23.098 |
| 9,273,908 B2 * | 3/2016 | Chludzinski | F28D 15/02 |
| 9,696,096 B2 * | 7/2017 | Uchida | F28D 15/0266 |
| 11,053,029 B1 * | 7/2021 | Goodzeit | B64G 1/58 |

(Continued)

FOREIGN PATENT DOCUMENTS

EP 1741972 A2 * 1/2007 ............... C10J 3/78

(Continued)

OTHER PUBLICATIONS

NASA, Conservation of Momentum, May 2021, NASA Glenn Research Center, (Year: 2021).*

(Continued)

*Primary Examiner* — Medhat Badawi
*Assistant Examiner* — Vicente Rodriguez

(57) ABSTRACT

A method of generating a momentum change in a vehicle by phase changing matter in a closed system is used to change the momentum of the vehicle without the need of a combustion system for propulsion. The method uses the multi-phase dynamics of fluidic matter to create a momentum differential within a closed system that results in a momentum excess that changes the overall momentum of the system. The change of the overall momentum of the system results in a change in motion of the vehicle. The momentum differential is achieved by phase changing the fluidic matter moving through a heat exchanger. The phase change of the fluidic matter is arranged so that the momentum of the fluidic matter is reduced as the fluidic matter leaves the heat exchanger. The reduction in momentum of the fluidic matter results in the momentum differential that changes the overall momentum of the system.

8 Claims, 13 Drawing Sheets

(56) References Cited

U.S. PATENT DOCUMENTS

| | | |
|---|---|---|
| 2008/0196412 A1 | 8/2008 | Miller |
| 2015/0096298 A1 | 4/2015 | Benn et al. |
| 2019/0309996 A1 | 10/2019 | Chancery et al. |
| 2020/0377237 A1 | 12/2020 | Hanson et al. |
| 2022/0018313 A1 | 1/2022 | Do |

OTHER PUBLICATIONS

Baird, Why is mass conserved in chemical reactions?, Oct. 2013, https://www.wtamu.edu/~cbaird/sq/2013/10/21/why-is-mass-conserved-in-chemical-reactions/ (Year: 2013).*

LibreTexts, Phase Changes, 2021, https://chem.libretexts.org/Bookshelves/Introductory_Chemistry/Basics_of_General_Organic_and_Biological_Chemistry_(Ball_et_al.)/07%3A_Energy_and_Chemical_Processes/7.03%3A_Phase_Changes#:~:text=A%20phase%20change%20is%20a,boiling%20point%20of%20the%20substance. (Year: 2021).*

Nelson Enrique Bolivar, Ivaylo T. Vasilev, Non-Combustion He Powered Propulsion, European Journal of Engineering and Technology Research, vol. 6, No. 2, Feb. 2021.

* cited by examiner

SYSTEM AND METHOD OF GENERATING A MOMENTUM CHANGE IN A VEHICLE BY PHASE CHANGING MATTER IN A CLOSED SYSTEM

The current application claims a priority to the U.S. provisional patent application Ser. No. 63/135,177 filed on Jan. 8, 2021.

FIELD OF THE INVENTION

The present invention relates generally to propulsion systems and phase changing technologies. More specifically, the present invention provides means of utilizing the multi-phase dynamics of matter to change the momentum of a vehicle.

BACKGROUND OF THE INVENTION

Nowadays, one of the biggest hurdles associated with spacecraft propulsion is the use of copious amounts of fuel for propulsion. The amount of fuel and the burning efficiency of the fuel often define the operational capabilities of the spacecraft, such as putting limitations on the range and the payload capacity of the spacecraft. This is best illustrated in the ideal rocket equation which broadly says that to move the spacecraft in one direction, the fuel needs to be exhausted in the opposite direction:

$$Mdu = dmv_e$$

Where M is the instantaneous mass of the spacecraft, du is the change in velocity of the spacecraft, dm is the change in exhausted mass (fuel), and $v_e$ is exhaust velocity. This leads to huge limitations on the spacecraft. The spacecraft must carry enough fuel to launch off the earth (the main propulsion system) and have enough fuel to perform its mission in outer space (the secondary propulsion systems). This fuel limitation hinders the operational capabilities of the spacecraft outside its predetermined parameters.

There have been several attempts in the past to create an engine that may eliminate usage of the fuel to generate propulsion. For example, the EmDrive is a conceptual thruster for spacecraft that utilizes a radio frequency (RF) resonant cavity thruster for generating thrust by reflecting microwaves internally in the device. However, the theory behind the EmDrive is in violation of the law of conservation of momentum and other laws of physics and has been unsuccessful in generating the required thrust for propelling the spacecraft. Other propulsion systems that do not require fuel such as electrical propulsion systems are still hindered by the efficiencies of its components, such as the power generation from solar panels.

There have also been attempts to create propulsion systems that are able to recycle some of the fuel being exhausted. Traditionally, exhaust propellent released is impossible to recycle as the fuel once combusted must be replaced to propel the spacecraft for future instances. Solid propulsion systems may offer a chance to recycle fuel. For example, by exhausting metal particles as propulsion means, the metal particles could be in theory captured back using magnetic forces that drain the metal particles back into the storage tank. However, the law of momentum conservation states that a closed system not subjected to external forces will not change its state of motion. In other words, if the metal particles are not exhausted, the spacecraft remains at its initial state of motion. Another alternative to propel the spacecraft may be the transformation of linear of momentum to another form of motion and vice versa (linear to angular momentum/angular to linear momentum). However, due to the law of momentum conservation, the spacecraft is not expected to change in motion as no external force has been applied to the closed system. The spacecraft will compensate for the change in momentum (e.g., the spacecraft may start spinning), but the overall momentum of the system is conserved.

Most of these solutions have failed to explore multi-phase dynamics of different fluids that not only follow the laws of physics, but also prove judicious from economical as well as environmental points of view. Propulsion systems can take advantage of the multi-phase dynamics of some fluids to generate propulsion in a closed system by phase-changing the fluids to generate a change in the overall momentum of the system. Further, phase-changing of fluids can be done using electrical systems, which could eliminate the need for the use of fuels for propulsion. Therefore, there is a need for improved systems and methods that leverage phase transitions of a fluid to propel a vehicle to overcome one or more of the above-mentioned problems and/or limitations.

SUMMARY OF THE INVENTION

The present invention provides a system and a method of generating a momentum change in a vehicle by phase changing matter in a closed system. The present invention takes advantage of the multi-phase dynamics of fluids to change the overall momentum of the system in such a way that the vehicle motion is changed in a desired direction. The present invention can be applied to different vehicles, from spacecrafts to aircrafts. Further, the matter (fluid) that can be used can range from inert gases to other matter that phase changes under desired conditions.

According to some embodiments, the system of the present invention is a closed system that includes two or more storage vessels and at least one heat exchanger. The storage vessels are in fluid communication with each other via the heat exchanger. In addition, the storage vessels are also in fluid communication with each other to form a closed loop. The matter (fluid) is moved through the closed loop via different means in either a continuous or intermittent flow. The overall method of the present invention involves moving the matter (fluid) from one of the storage vessels to the other storage vessel through the heat exchanger. Within the heat exchanger, the matter (fluid) goes through several phase changes as the matter (fluid) moves through the heat exchanger. As the matter (fluid) moves through the heat exchanger, the matter (fluid) minimally interacts with the heat exchanger. The arrangement of the several phase changes is designed to create a momentum differential within the system by increasing/decreasing the momentum of the matter (fluid) by the time the matter (fluid) exits the heat exchanger. Since the matter (fluid) has minimal interaction with the vehicle's system, there is an excess of momentum in the system that changes the overall momentum of the system. Thus, the vehicle's momentum is also changed, which changes the motion of the vehicle. The matter (fluid) is then moved back to the original setup so that the process can be repeated, continuously or intermittently, to propel the vehicle in the desired direction.

The unique setup of the present invention enables the use of electricity to selectively phase change the matter (fluid) as necessary throughout the heat exchanger, thus eliminating the need to burn and exhaust fuel for the propulsion of the vehicle. Further, the heat exchanger can be arranged to be exposed to the vehicle's surroundings, such as outer space or high atmospheric altitude, which reduces the need for electrical power to phase change the matter (fluid) moving through the heat exchanger. Additional features and benefits of the present invention are further discussed in the sections below.

DETAIL DESCRIPTIONS OF THE INVENTION

Figure 1:
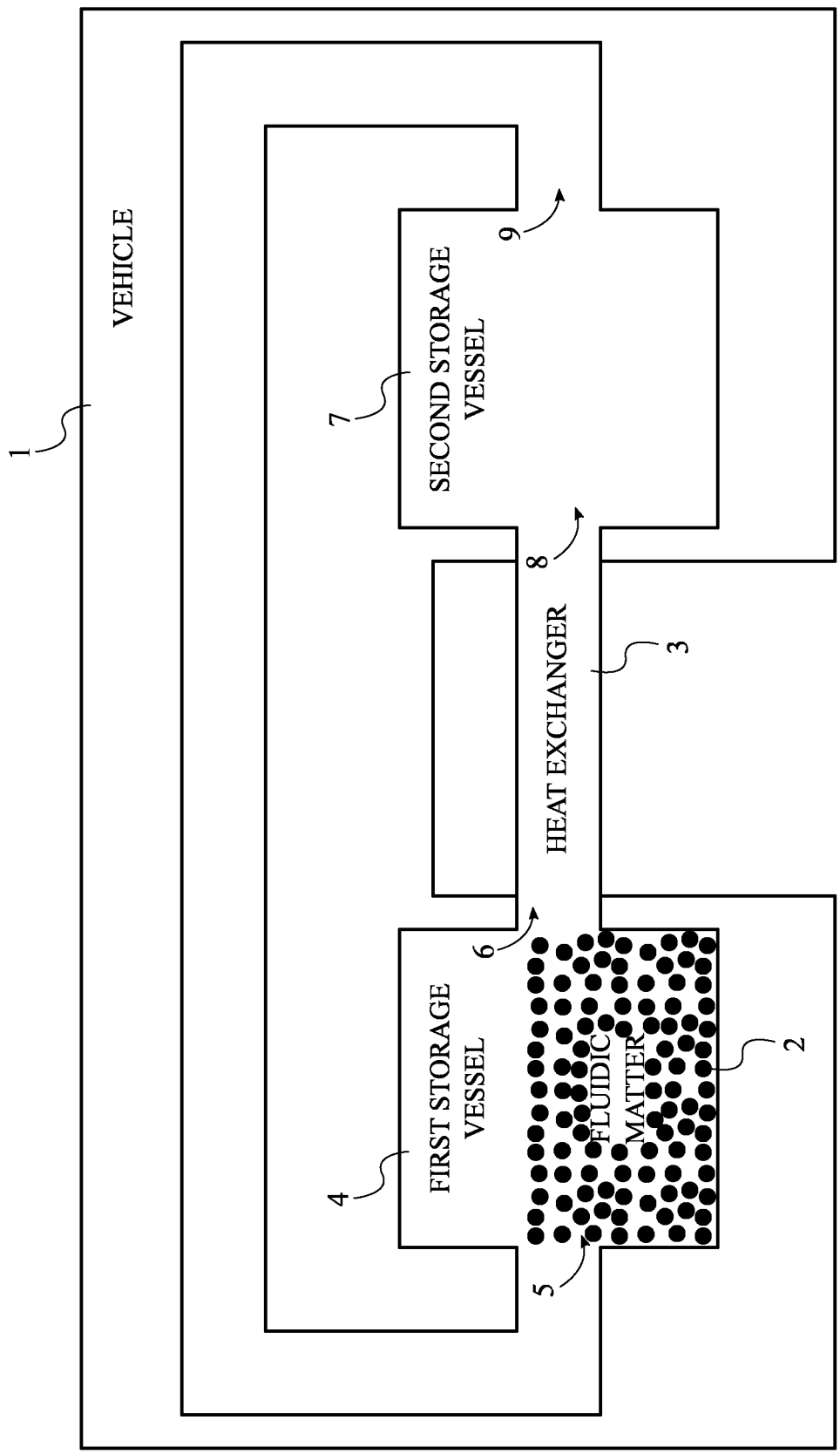
FIG. 1 is a schematic view showing the system of the present invention, wherein a quantity of fluidic matter is shown stored within a first storage vessel.
Figure 2:
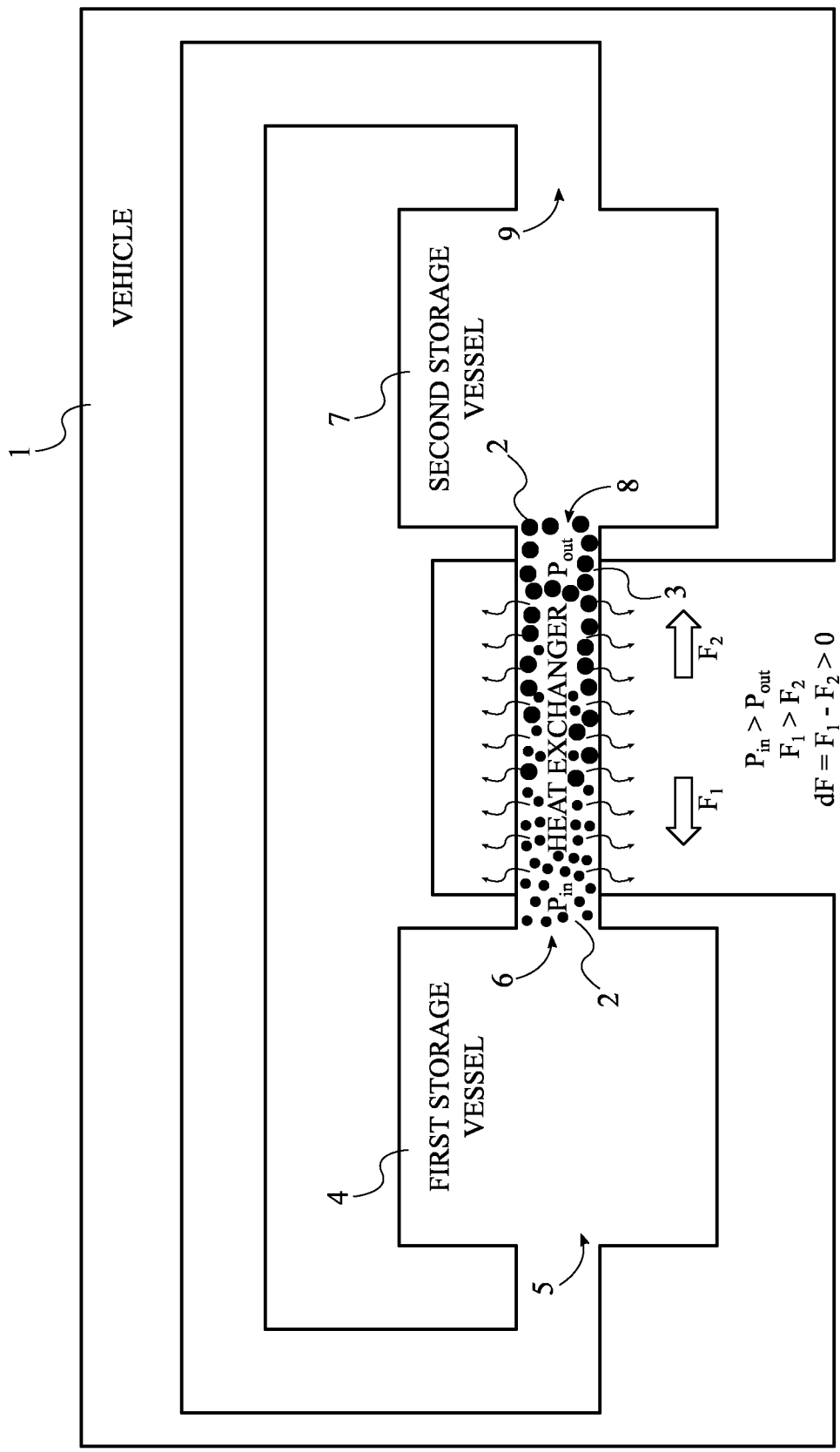
FIG. 2 is a schematic view showing the system of the present invention, wherein the quantity of fluidic matter is shown moving through a heat exchanger.
Figure 3:
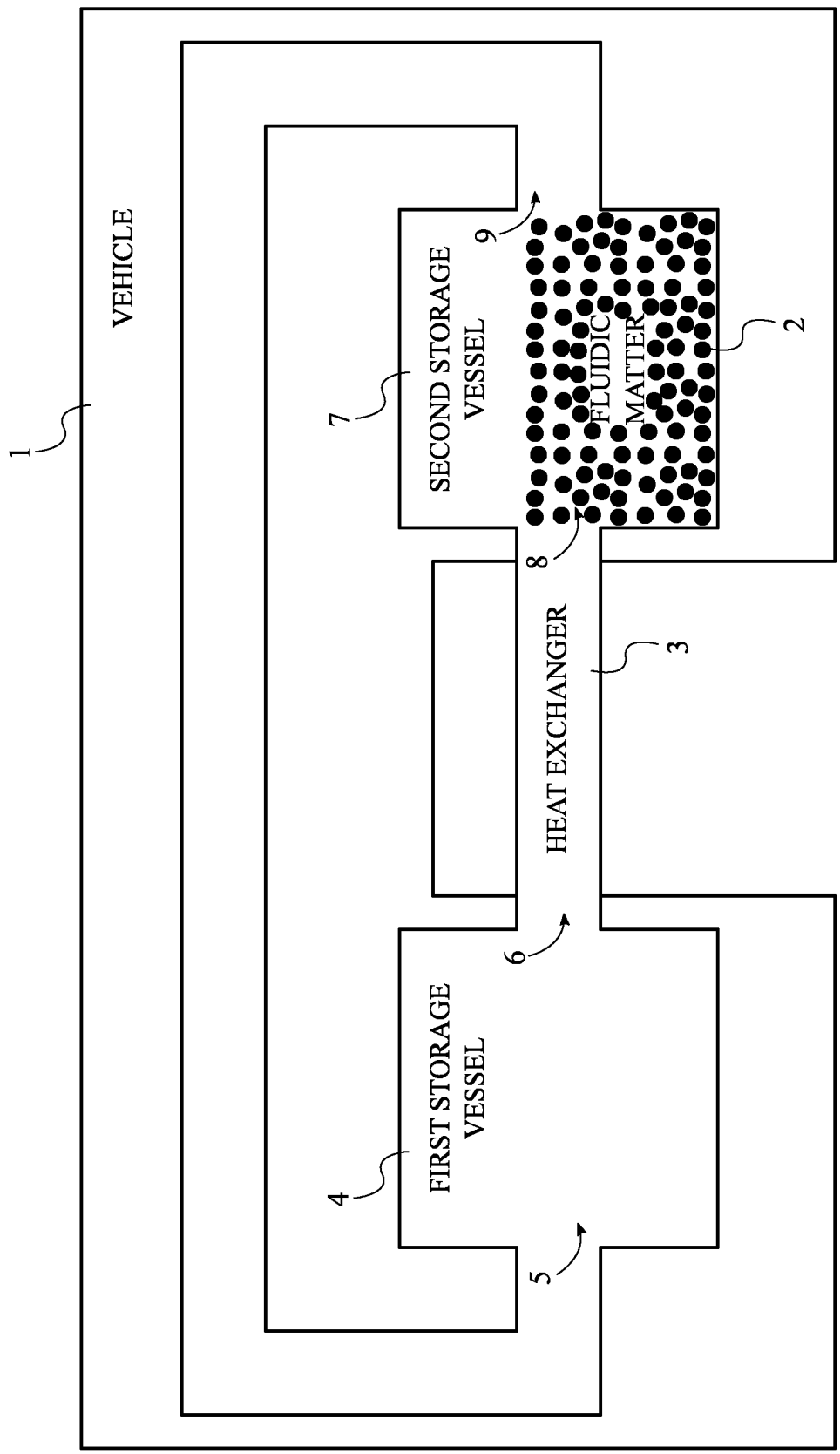
FIG. 3 is a schematic view showing the system of the present invention, wherein the quantity of fluidic matter is shown collected within a second storage vessel.
Figure 4:
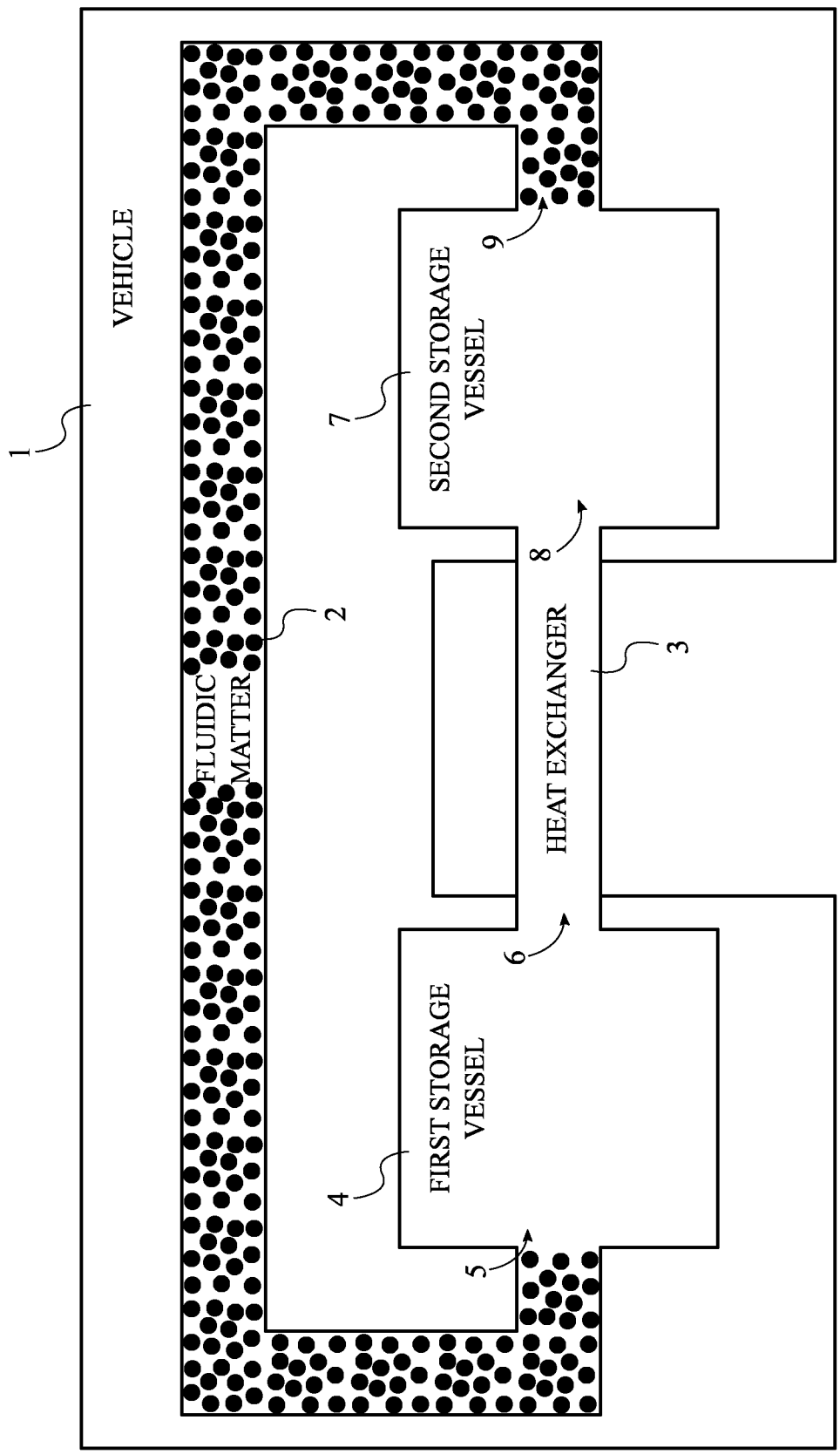
FIG. 4 is a schematic view showing the system of the present invention, wherein the quantity of fluidic matter is shown being returned to the first storage vessel.

All illustrations of the drawings are for the purpose of describing selected versions of the present invention and are not intended to limit the scope of the present invention.

The present invention is a system and a method of generating a momentum change in a vehicle by phase changing matter in a closed system. The present invention is used to propel a vehicle in the desired direction without the need of a combustion system for propulsion. As can be seen in FIG. 1 through 7, in order to accomplish this, the system of the present invention is provided with a vehicle 1, a quantity of fluidic matter 2, at least one first storage vessel 4, at least one heat exchanger 3, and at least one second storage vessel 7 (Step A). The vehicle 1 is designed to carry a payload along with the rest of the system. The first storage vessel 4 and the second storage vessel 7 help retain the quantity of fluidic matter 2 at different stages of the overall process. The heat exchanger 3 enables the phase changing of the quantity of fluidic matter 2. The system of the present invention is arranged to form a closed system where the quantity of fluidic matter 2 is recycled to be used for several iterations of the process.

To do so, the first storage vessel 4 comprises at least one first inlet 5 and at least one first outlet 6, as can be seen in FIG. 1 through 6. Similarly, the second storage vessel 7 comprises at least one second inlet 8 and at least one second outlet 9. Both the first inlet and the second inlet 8 enable the inflow of the quantity of fluidic matter 2 into the first storage vessel 4 and the second storage vessel 7, respectively. On the other hand, both the first outlet 6 and the second outlet 9 enable the outflow of the quantity of fluidic matter 2 out of the first storage vessel 4 and the second storage vessel 7, respectively. To form the closed system, the first outlet 6 is in fluid communication with the second inlet 8 through the heat exchanger 3. Consequently, the first storage vessel 4 is terminally positioned to the heat exchanger 3, and wherein the second storage vessel 7 is terminally positioned to heat exchanger 3, opposite to the first storage vessel 4. This ensures that the quantity of fluidic matter 2 moves from the first storage vessel 4 to the second storage vessel 7 through the heat exchanger 3. Further, the second outlet 9 is in fluid communication with the first inlet 5 to ensure that the quantity of fluidic matter 2 is moved back to the first storage vessel 4 from the second storage vessel 7. Both the first storage vessel 4 and the second storage vessel 7 can be provided as multiple units arranged to be in fluid communication with each other in a closed system. Likewise, multiple heat exchangers can be provided to accommodate multiple storage vessels. Furthermore, to reduce the power necessary to phase change the quantity of fluidic matter 2, the first storage vessel 4 and the second storage vessel 7 are internally mounted within the vehicle 1, while the heat exchanger 3 is externally mounted to the vehicle 1. This enables the heat exchanger 3 to be exposed to the surroundings of the vehicle 1 to phase change the quantity of fluidic matter 2 according to the conditions of the surroundings of the vehicle 1.

The overall process followed by the method of the present invention enables the change of the overall momentum of the vehicle 1 using the phase-dynamics of the quantity of fluidic matter 2. The change of the overall momentum of the vehicle 1 enables the propelling of the vehicle 1 in a desired direction without the use of a combustion propulsion system. As can be seen in FIGS. 1 through 4 and 7, the overall method starts by phase changing a working portion of the quantity of fluidic matter 2 from a first matter state into a second matter state as the working portion traverses from the first storage vessel 4, through the first outlet 6, and into the heat exchanger 3 (Step B). The working portion of the quantity of fluidic matter 2 is phase changed in such a way that the momentum of the quantity of fluidic matter 2 is increased (or decreased according to different embodiments of the present invention). The phase change during the Step B can be done by heating or cooling the working portion.

Further, the working portion can be the whole amount of the quantity of fluid matter or a partial amount of the quantity of fluidic matter 2. However, the whole quantity of fluidic matter 2 is moved into the heat exchanger 3 during the Step B. After the working portion has been phase changed during the Step B, the working portion is then phase changed from the second matter state into the first matter state as the working portion traverses from the heat exchanger 3, through the second inlet 8, and into the second storage vessel 7 (Step C). Due to the heat exchanger 3 being exposed to the surroundings of the vehicle 1, the conditions of the surroundings heat or cool down the working portion which cause the working portion to phase change during the Step C.

As can be seen in FIGS. 1 through 4 and 7, the phase change during the Step C is arranged to lower the momentum of the working portion, which reduces the overall momentum of the quantity of fluidic matter 2. This creates a momentum differential within the heat exchanger 3 where the momentum of the quantity of fluidic matter 2 adjacent to the first storage vessel 4 is larger than the momentum adjacent to the second storage vessel 7. The momentum differential results in an excess in momentum in the system that changes the overall momentum of the vehicle 1 to create thrust for the vehicle 1. Again, like in the Step B, the whole quantity of fluidic matter 2 is moved into the second storage vessel 7 during the Step C. After the quantity of fluidic matter 2 has been collected inside the second storage vessel 7, the working portion in the first matter state and the rest of the quantity of fluidic matter 2 are returned from the second storage vessel 7, through the second outlet 9, through the first inlet 5, and into the first storage vessel 4 (Step D). This enables the recycling of the quantity of fluidic matter 2. Then, a plurality of iterations for the Steps B through D can be executed to generate a momentum change in the vehicle 1 (Step E). The plurality of iterations can be performed continuously for continuous momentum change of the vehicle 1. Alternatively, the plurality of iterations can be performed intermittently to propel the vehicle 1 as necessary in different occasions.

Figure 8:
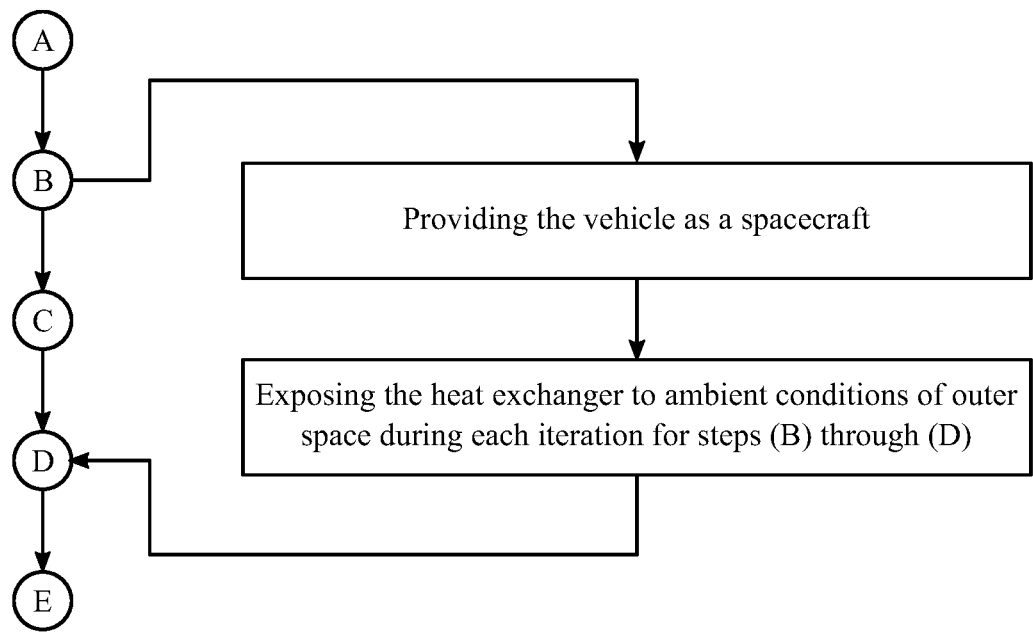
FIG. 8 is a flowchart depicting the subprocess of changing the momentum of a spacecraft using the present invention.
Figure 9:
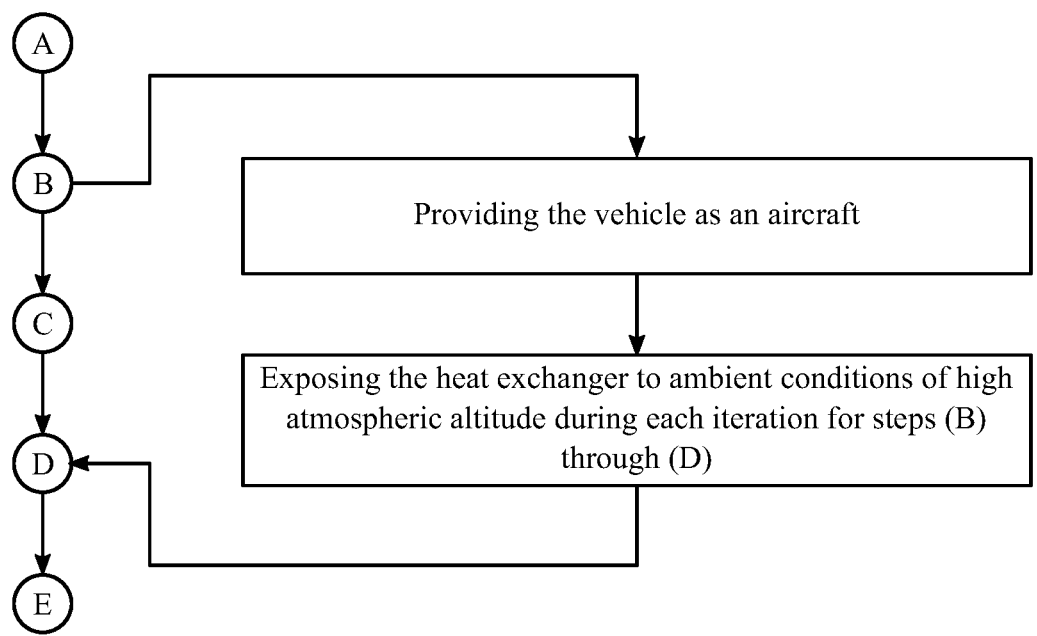
FIG. 9 is a flowchart depicting the subprocess of changing the momentum of an aircraft using the present invention.

As previously discussed, the present invention can be utilized as the propulsion system for different types of vehicles. In one embodiment, as can be seen in FIG. 8, the vehicle 1 is provided as a spacecraft, and the heat exchanger 3 is exposed to ambient conditions of outer space during each iteration for the Steps B through D. The ambient conditions of outer space are characterized by a low temperature, about 2.7 Kelvins (K) and very low pressure. These ambient conditions facilitate the phase changing of the quantity of fluidic matter 2 by greatly cooling the working portion. In another embodiment, as can be seen in FIG. 9, the vehicle 1 is provided as an aircraft, and the heat exchanger 3 is exposed to ambient conditions of high atmospheric altitude during each iteration for the Steps B through D. Further, due to the different requirements of the different types of vehicles, different types of matter can be utilized for the quantity of fluidic matter 2. In one embodiment, the quantity of fluidic matter 2 is an inert gas, such as Helium-4 ($^4$He). The $^4$He, under 1 atmosphere (atm) of pressure, has been observed to remain in a gaseous state up to a temperature of 4.22 K. Below 4.22 K, also under 1 atm, the $^4$He may be in a liquid state. In the liquid state, $^4$He has been observed to show unusual behavior that may include two liquid phases (Helium-I that may exist between a temperature range of 2.18 K to 4.22 K and Helium-II that may exist between a temperature range below 2.18 K) with a transition between the two liquid phases in a phase transition without boiling.

In addition, Helium-II has been observed to be a superfluid that may flow with almost zero viscosity. The almost zero viscosity of Helium-II may result in superfluidity of the $^4$He, which almost eliminates the interaction with the heat exchanger 3 such that overall momentum change and/or reduction may be ensured to be a result of the phase transition of the $^4$He. In another embodiment, the quantity of fluidic matter 2 is selected from a group consisting of: Hydrogen, Oxygen, Nitrogen, an alcohol, and combinations thereof. Furthermore, the quantity of fluidic matter 2 can be provided in different states at the beginning of the overall process according to the systems requirements. For example, the quantity of fluidic matter 2 can be provided as a liquified quantity of fluid matter so that the first matter state is a liquid, and the second matter state is a gas. However, the quantity of fluidic matter 2 can be provided in different states, such as a solid, gas, plasma, or a mixture thereof.

Figure 5:
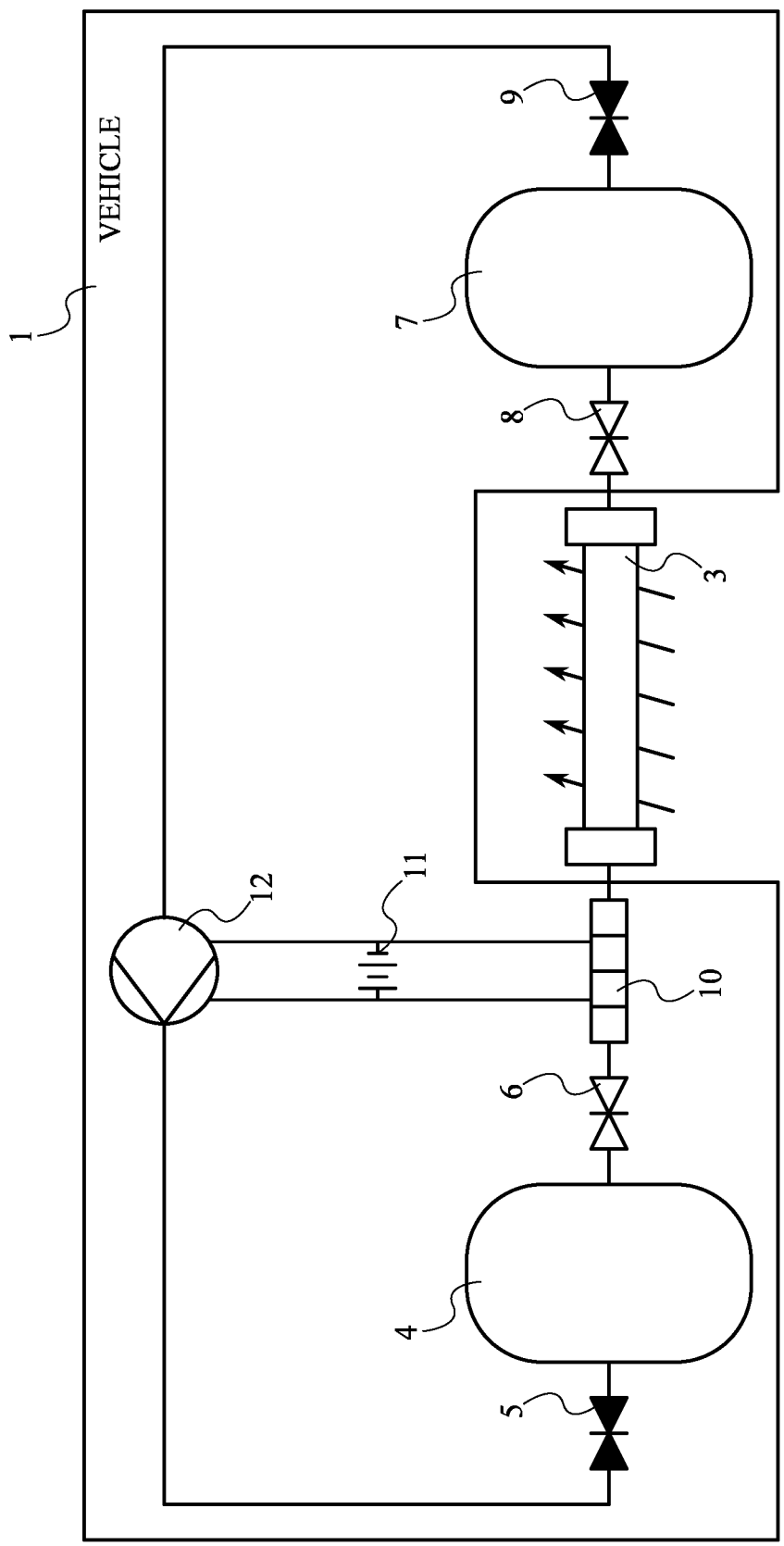
FIG. 5 is a schematic view showing the system of the present invention, wherein the first inlet of the first storage vessel and the second outlet of the second storage vessel are shown closed, and wherein the first outlet of the first storage vessel and the second inlet of the second storage vessel are shown open.
Figure 6:
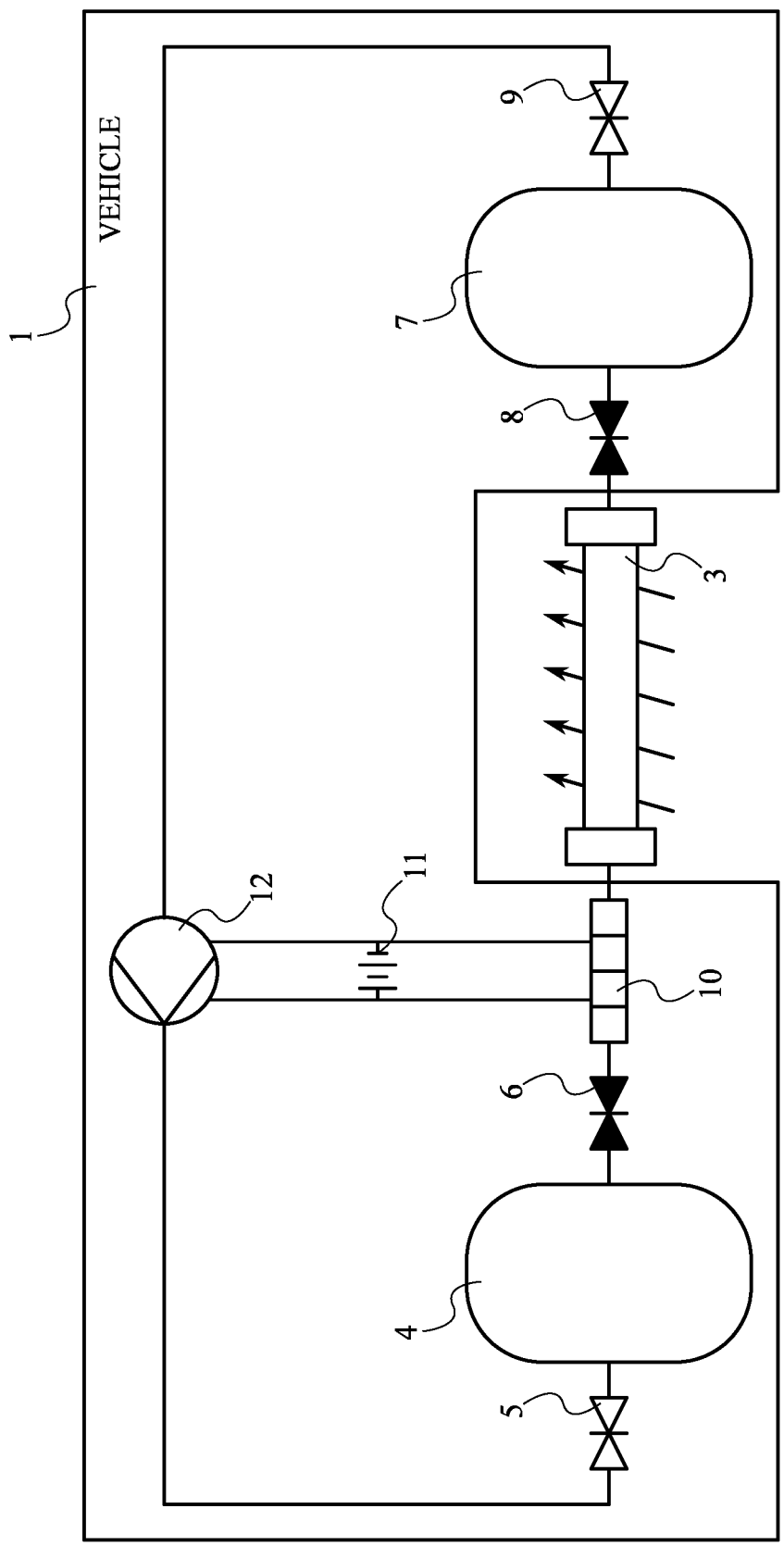
FIG. 6 is a schematic view showing the system of the present invention, wherein the first inlet of the first storage vessel and the second outlet of the second storage vessel are shown open, and wherein the first outlet of the first storage vessel and the second inlet of the second storage vessel are shown closed.
Figure 7:
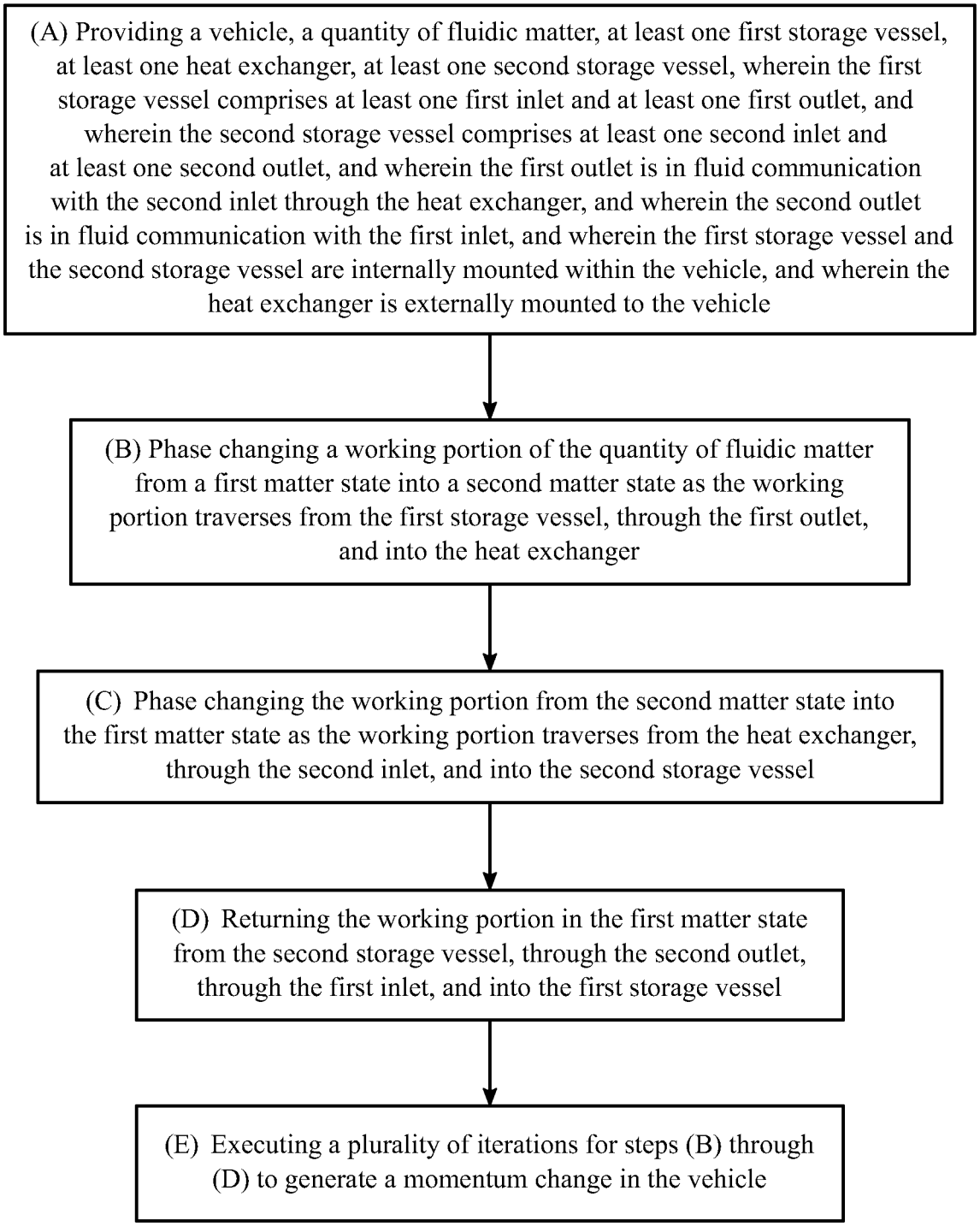
FIG. 7 is a flowchart depicting the overall method of the present invention.
Figure 10:
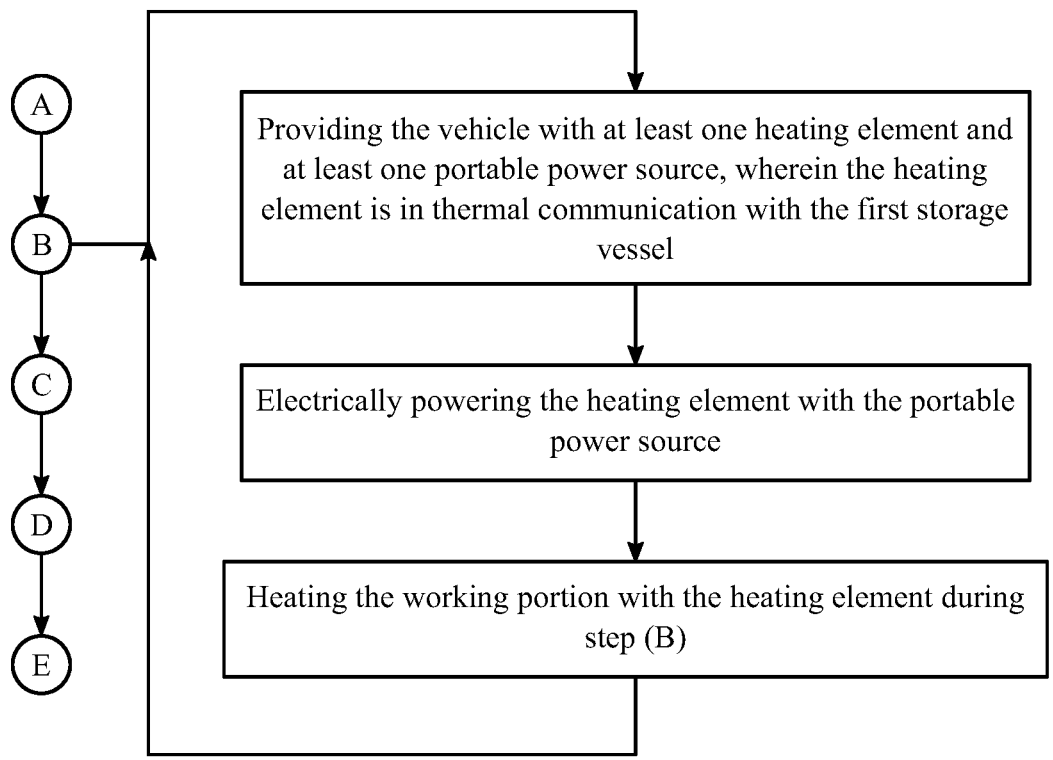
FIG. 10 is a flowchart depicting the subprocess of heating a working portion of the quantity of fluidic matter using a heating element.

In the spacecraft embodiment, the present invention is preferably configured to utilize electricity to power up electrical components to enable the phase changing of the working portion during the Step B. To do so, the vehicle 1 is provided with at least one heating element 10 and at least one portable power source 11, as can be seen in FIGS. 5 and 6. The at least one heating element 10 is an electrical heating element while the power source 11 is an electric source. This enables for recharging of the power source 11 in space with the use of solar panels. In addition, the heating element 10 is in thermal communication with the first storage vessel 4 so that the working portion can be heated during the Step B. As can be seen in FIG. 10, the subprocess of heating the working portion starts by electrically powering the heating element 10 with the portable power source 11. This increases the temperature of the heating element 10 to the temperature necessary to phase change the working portion. Then, the working portion is heated with the heating element 10 during the Step B until the phase change (e.g., melting, vaporization, sublimation, ionization) occurs. Then, during the Step C, the working portion is cooled down due to the low temperature of outer space so that the second phase change (e.g., freezing, condensation, deposition, recombination) occurs. To facilitate the cooling of the working portion within the heat exchanger 3, the heat exchanger 3 is an elongated thermally conductive pipe that provides a large surface area for heat transfer between the working portion and the outer space.

Figure 11:
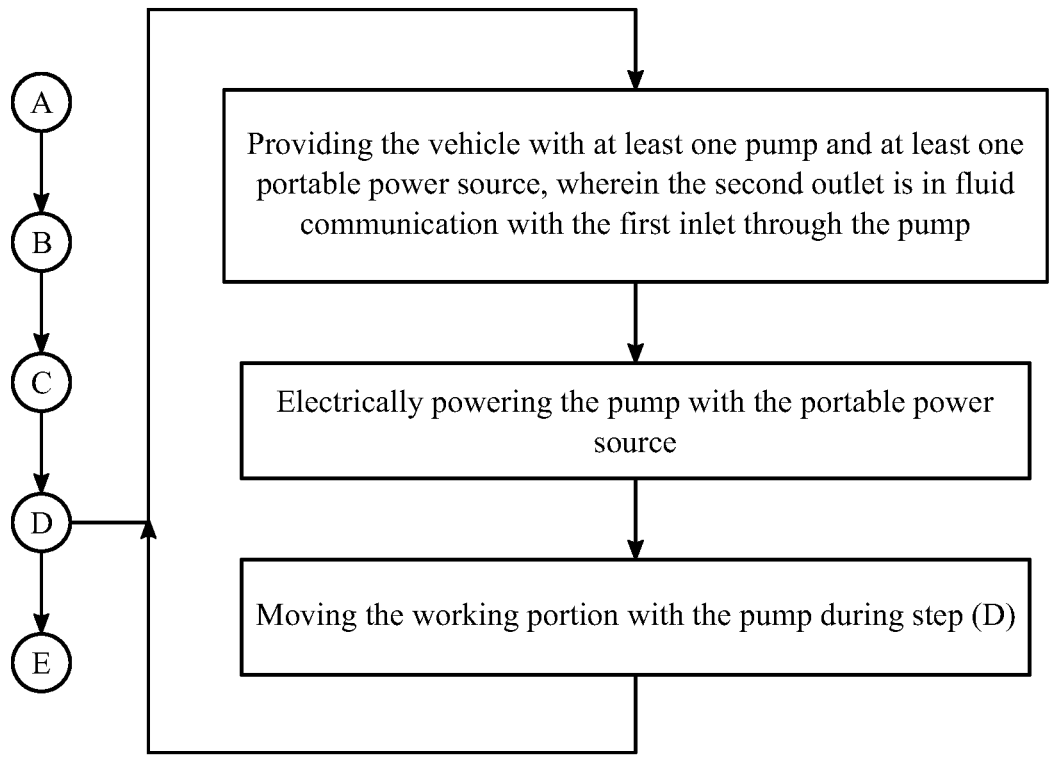
FIG. 11 is a flowchart depicting the subprocess of moving the working portion of the quantity of fluidic matter from the second storage vessel to the first storage vessel using a pump.

In the spacecraft embodiment, after the working portion has been cooled down during the Step C, the present invention can provide means to move the liquified working portion along with the rest of the quantity of fluidic matter 2 back into the first storage vessel 4. To do so, the vehicle 1 can be provided with at least one pump 12, as can be seen in FIGS. 5 and 6. The pump 12 can be an electric pump that can be powered with the power source 11 that also powers the heating element 10. In addition, the second outlet 9 is in fluid communication with the first inlet 5 through the pump 12 so that the liquified quantity of fluidic matter 2 can be pumped back into the first storage vessel 4. As can be seen in FIG. 11, the subprocess of pumping the liquified quantity of fluidic matter 2 starts by electrically powering the pump 12 with the portable power source 11. Then, the working portion as well as the rest of the quantity of fluidic matter 2 is moved with the pump 12 during the Step D.

Figure 12:
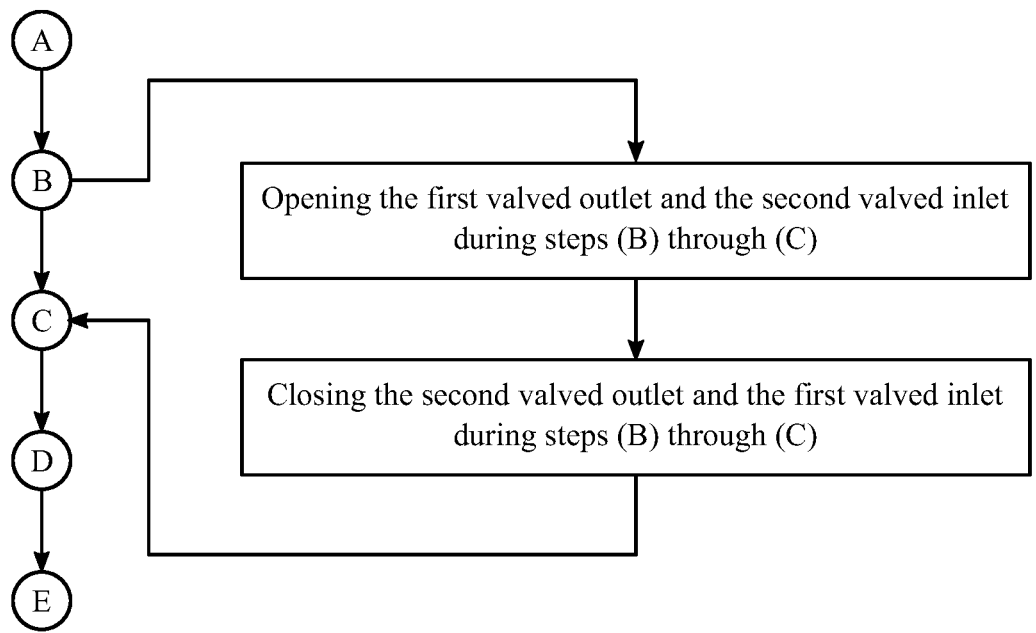
FIG. 12 is a flowchart depicting the subprocess of controlling the movement of the working portion of the quantity of fluidic matter through the heat exchanger by closing the first inlet of the first storage vessel and the second outlet of the second storage vessel and by opening the first outlet of the first storage vessel and the second inlet of the second storage vessel.
Figure 13:
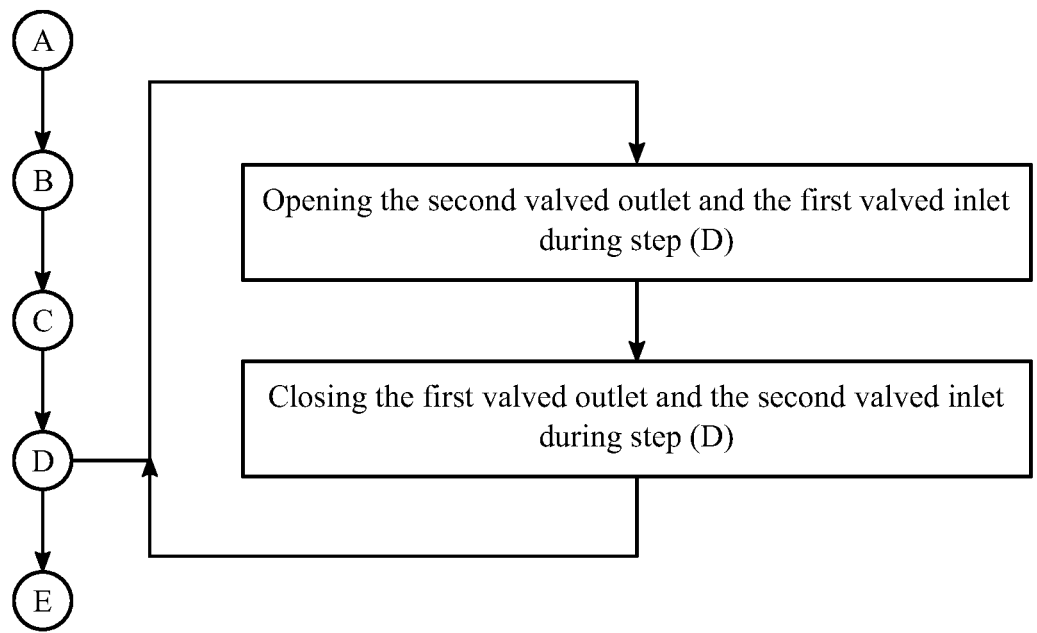
FIG. 13 is a flowchart depicting the subprocess of recycling the working portion of the quantity of fluidic matter by opening the first inlet of the first storage vessel and the second outlet of the second storage vessel and by closing the first outlet of the first storage vessel and the second inlet of the second storage vessel.

Furthermore, to increase the efficiency of the system, the system can be provided with mechanical means to control the movement of the quantity of fluidic matter 2 throughout the system. In one embodiment, the first inlet 5 is a first valved inlet, the first outlet 6 is a first valved outlet, the second inlet 8 is a second valved inlet, and the second outlet 9 is a second valved outlet, as can be seen in FIGS. 5 and 6. By providing valved inlets and valved outlets, the system can control the movement of the quantity of fluidic matter 2 into and out of the storage vessels. For example, as can be seen in FIGS. 12 and 13, the first valved outlet and the second valved inlet are opened during the Steps B through C to enable the movement of the quantity of fluidic matter 2 from the first storage vessel 4 to the second storage vessel 7 through the heat exchanger 3. In addition, the second valved outlet and the first valved inlet are closed during the Steps B through D so that the quantity of fluidic matter 2 does not move back into the second storage vessel 7 without going through the heat exchanger 3. On the other hand, the second valved outlet and the first valved inlet are opened during the Step D to enable the movement of the quantity of fluidic matter 2 from the second storage vessel 7 to the first storage vessel 4. In addition, the first valved outlet and the second valved inlet are closed during the Step D to prevent movement of the quantity of fluidic matter 2 back into the heat exchanger 3. The opening and closing of the valved inlets and outlets facilitate the intermittent execution of the Step E. Alternatively, the valved inlets and outlets can be left open to enable the continuous execution of Step E.

To illustrate the effectiveness of the system and the method of the present invention, ANSYS FLUENT software pack with full version was used for modeling the pipe gas-liquid dynamic of $^4$He, including the gas, and phases Helium-I and Helium-II. The aim was to set the initial and final conditions and run a multi-parametric optimization, in such a way that several plausible scenarios could be attained. The density-based solver in ANSYS FLUENT solves the governing equations of continuity, momentum, and energy and species transport simultaneously as a set of equations shown below:

$$\frac{\partial \rho}{\partial t} + \nabla \cdot (\rho \vec{u}) = 0$$

$$\frac{\partial (\rho \vec{u})}{\partial t} + \nabla \cdot (\rho \vec{u} \vec{u}) = -\nabla p + \nabla \cdot (\tau_m + \tau_{SGS})$$

$$\frac{\partial (\rho E)}{\partial t} + \nabla \cdot (\rho \vec{u} H) = (\vec{u} \cdot (\tau_m + \tau_{SGS})) + (\vec{q}_m + \vec{q}_{SGS})$$

Where $\rho$ is the density, $\vec{u}$ velocity, E total energy per unit mass, and p pressure of the fluid. The $\tau$'s are the viscous components and $\vec{q}$'s the heat flux. The term H contains source terms. ANSYS also contemplates Fluid-Fluid momentum exchange and phase change modeling. A general multiphase system consists of interacting phases dispersed randomly in space and time and using averaging techniques and closure assumptions to model the unknown quantities. Eurelian solving method is used to run a parametric simulation based on a pipe (heat exchanger 3) with maximum length set to 30 meters (m) and radius of 5 m. Given the parameters to be optimized, a small mesh was setup, and many iterations were used to ensure proper convergence of the results.

The Table 1 shows the results for several parametric optimizations given the constraints imposed by Helium physical characteristics, and using primarily inlet temperature, length, and radius of the pipe as parameters. Table 1 shows 20 points that represent a set of optimize parameters that fulfills the desire conditions of the momenta. The inlet temperature and pressure are also reported. The momenta are M1 which refers to the momentum entering the pipe, and M2 as the momentum of the liquefied gas leaving the pipe. Other parameters are the length and radius of the pipe. The last column shows the ratio between M1 and M2, defined as $$R = \frac{M1}{M2}.$$

A ratio larger than one means that the momentum M2 leaving the pipe is lower than M1 and R give us the decreasing proportion between them.

TABLE 1

Number of points of 3D simulations that arose values of R > 1.
The points N = 5, N = 11 and N = 16 are the most stable and promising.

| N | Inlet pressure (Pa) | Inlet temperature (K) | Lenth (m) | Radius (m) | M1 (N) | M2 (N) | Ratio |
|---|---|---|---|---|---|---|---|
| 1 | 2.53 | 6.80 | 22.50 | 2.55 | 1169.14 | 1080.92 | 1.08 |
| 2 | 4.90 | 9.78 | 15.45 | 4.93 | 5070.00 | 4793.54 | 1.06 |
| 3 | 4.73 | 3.62 | 15.14 | 4.79 | 2789.40 | 2737.14 | 1.02 |
| 4 | 4.90 | 3.81 | 15.84 | 0.15 | 0.66 | 0.63 | 1.05 |
| 5 | 0.27 | 9.82 | 29.26 | 0.11 | 0.09 | 0.045 | 2.08 |
| 6 | 4.43 | 9.95 | 29.92 | 4.98 | 17702.20 | 12941.30 | 1.37 |
| 7 | 4.99 | 3.70 | 29.57 | 4.53 | 5554.25 | 5398.14 | 1.03 |
| 8 | 0.18 | 9.66 | 15.13 | 4.70 | 4124.11 | 3804.93 | 1.08 |
| 9 | 4.95 | 9.88 | 29.17 | 0.46 | 69.75 | 53.15 | 1.31 |
| 10 | 4.72 | 9.75 | 15.36 | 0.31 | 11.16 | 9.93 | 1.12 |
| 11 | 0.24 | 9.19 | 15.26 | 0.13 | 0.40 | 0.30 | 1.34 |
| 12 | 0.36 | 3.75 | 28.69 | 0.17 | 0.28 | 0.24 | 1.16 |
| 13 | 0.58 | 3.90 | 29.31 | 4.96 | 6018.03 | 5818.04 | 1.03 |
| 14 | 4.89 | 3.87 | 29.43 | 0.22 | 1.78 | 1.63 | 1.09 |
| 15 | 0.25 | 3.79 | 15.18 | 1.01 | 84.11 | 81.59 | 1.03 |
| 16 | 0.17 | 9.73 | 29.08 | 4.98 | 16325.90 | 12193.70 | 1.34 |
| 17 | 0.88 | 4.39 | 15.31 | 4.86 | 2526.62 | 2438.51 | 1.04 |
| 18 | 4.67 | 6.89 | 22.33 | 4.91 | 4551.70 | 4248.85 | 1.07 |
| 19 | 4.94 | 6.95 | 15.27 | 2.64 | 1189.80 | 1125.80 | 1.06 |
| 20 | 2.44 | 9.91 | 21.85 | 4.63 | 5792.72 | 5169.65 | 1.12 |

There are three points with the most interesting results, points N=5, 11, and 16. At point N=5 the results are the one with more efficiency, R=2:08, equivalent to a 108% decrease of the exhaust momentum. This particular point has a pipe length of ~29 m and a radius ~0.1 m, although the output and input momentum are very low. The fraction of gas-liquid distribution in the pipe increases as we go near the center of the pipe, while the velocity magnitude decreases, reaching a stationary point after the middle of the pipe, close to 25 m. This is an indication of the phase change influence on the final momentum. The point N=11 on the other hand, has a length of ~15 m and a similar radius than point N=5. A shorter pipe changes the actual configuration, the inlet and outlet temperatures are also similar, but the result R=1.34 or equivalent 34% is smaller. The volume fraction peak in this case is closer to the beginning of the pipe, the velocity maximum is rather far than N=5, indicating that most of the liquefaction takes place in the middle of the pipe as in N=5, but that under the same pressure conditions the velocity is larger also around the middle reducing slightly when reaching the end of the pipe. The output momenta are one order of magnitude larger than N=5, also an indication that the requirements for larger R are very subtle, a product of the phase change, and sensitive to the amount space needed to achieve the transition.

The point N=16 has almost the same length of ~29 m but a significantly larger radius of ~5 m. The fraction of volume never reaching a maximum, the liquid phase dominates at the end of the pipe. There is a drop in the velocity, marked as the volume fraction increases. The final momenta, on the other hand, decreases significantly, indicating a semi-stable point, where the system is not reaching equilibrium values. The sensitivities of the system in the parameters indicate a large radius significantly reduces the ratio, the length a secondary crucial parameter. The largest sensitivity comes from the temperature as expected, also the radius dramatically changes the ratio R. Point N=5 appears as the best candidate in terms of maximal ratio, also reaches a minimal momentum for outlet and inlet parameters, which translates into less energy necessary to maintain the storage vessel unbalance in pressure and temperature. There is a large contrast in the velocity between the initial and final points of up to twice the magnitude for this point.

In conclusion, the setup proposed shows that by taking advantage of the low temperatures in outer space, the exhaust gas momentum during the phase transition of Helium can be significantly reduced. This implies that the system can store and recycle the liquid Helium without losing all the momentum (which the $^4$He exhaust creates on the first place), making the whole setup a closed system. This fluidic matter 2 can be used in several different ways such as transporting the liquefied Helium from the second storage vessel 7 to the first storage vessel 4, and then heat up and exhaust the fluidic matter 2 in the pipe to second storage vessel 7. In this way, the system can work solely with electricity as a power source to heat and move the Helium inside of the system to create acceleration for the vehicle 1, making the present invention a non-combustion $^4$He-based, electrically powered, closed-system propulsion. The liquidizing of some flowing materials, like Helium, results into multi-phase dynamics that works as an optimization system for macroscopic changes. The proposed setup leads to very interesting results, depending on geometry, temperature, and the pressure difference between the storage vessels. For long pipes of ~29 m and small radius of ~0.01 m, the system has maximal optimization to reduce $P_{out}$. The lack of viscosity plays a fundamental role, as it can be seen when the radius is increased. If the radius is increased by two orders of magnitude and under the temperature range being considered, much less gas is liquefied in the pipe, and the coexistence of Helium-I and Helium-II phases causes a larger overall viscosity in the system. The viscosity produces interaction with the walls of the pipe, reducing the optimized situation for momentum reduction. A similar situation in terms of the viscosity takes place when the pipe is shortened. Phase transition gives a landscape of possibilities for macroscopic applications to propulsion systems.

Although the invention has been explained in relation to its preferred embodiment, it is to be understood that many other possible modifications and variations can be made without departing from the spirit and scope of the invention.

What is claimed is:

1. A method of generating a momentum change in a vehicle by phase changing matter in a system that is closed for particle exchange but is open for energy exchange, the method comprising the steps of:
   (A) providing a vehicle, a quantity of fluidic matter, at least one first storage vessel, at least one heat exchanger, at least one second storage vessel, wherein the vehicle comprises at least one pump, at least one portable power supply, at least one heating element, and at least one portable power source, and wherein the first storage vessel comprises at least one first valved inlet and at least one first valved outlet, and wherein the second storage vessel comprises at least one second valved inlet and at least one second valved outlet, and wherein the first valved outlet is in fluid communication with the second valved inlet through the heat exchanger, and wherein the second valved outlet is in fluid communication with the first valved inlet through the pump, and wherein the first storage vessel and the second storage vessel are internally mounted within the vehicle, and wherein the heat exchanger is externally mounted to the vehicle, and wherein the heat exchanger is an elongated thermally-conductive pipe, and wherein the first storage vessel is terminally positioned to the heat exchanger, and wherein the second storage vessel is terminally positioned to heat exchanger, opposite to the first storage vessel, and wherein the heating element is in thermal communication with the first storage vessel;
   (B) phase changing a working portion of the quantity of fluidic matter from a first matter state into a second matter state as the working portion traverses from the first storage vessel, through the first valved outlet, and into the heat exchanger, wherein the first matter state is a liquid, and wherein the second matter state is a gas;
   (C) phase changing the working portion from the second matter state into the first matter state as the working portion traverses from the heat exchanger, through the second valved inlet, and into the second storage vessel;
   (D) returning the working portion in the first matter state from the second storage vessel, through the second valved outlet, through the first valved inlet, and into the first storage vessel;
   (E) executing a plurality of iterations for steps (B) through (D) in order to generate a thermal radiation pressure force with the heat exchanger, wherein the thermal radiation pressure force is used to propel the vehicle;
   moving the working portion with the pump during step (D) by electrically powering the pump with the portable power source;
   electrically powering the heating element with the portable power source; and,
   heating the working portion with the heating element during step (B).

2. The method as claimed in claim 1 comprising the steps of:
   providing the vehicle as a spacecraft; and,
   exposing the heat exchanger to ambient conditions of outer space during each iteration for steps (B) through (D).

3. The method as claimed in claim 1 comprising the steps of:
   providing the vehicle as an aircraft; and,
   exposing the heat exchanger to ambient conditions of high atmospheric altitude during each iteration for steps (B) through (D).

4. The method as claimed in claim 1, wherein the quantity of fluidic matter is an inert gas.

5. The method as claimed in claim 4, wherein the inert gas is Helium-4.

6. The method as claimed in claim 1, wherein the quantity of fluidic matter is selected from a group consisting of: Hydrogen, Oxygen, Nitrogen, and combinations thereof.

7. The method as claimed in claim 1 comprising the steps of:
   opening the first valved outlet and the second valved inlet during steps (B) through (C); and,
   closing the second valved outlet and the first valved inlet during steps (B) through (C).

8. The method as claimed in claim 1 comprising the steps of:
- opening the second valved outlet and the first valved inlet during step (D); and,
- closing the first valved outlet and the second valved inlet during step (D).

* * * * *